US006653892B2

(12) United States Patent
Park

(10) Patent No.: US 6,653,892 B2
(45) Date of Patent: Nov. 25, 2003

(54) SQUELCH CIRCUIT TO CREATE A SQUELCH WAVEFORM FOR USB 2.0

(75) Inventor: Kwang-Il Park, Kyoungki-do (KR)

(73) Assignee: Hynix Semiconductor, Inc., Kyoungki-Do (KR)

(*) Notice: Subject to any disclaimer, the term of this patent is extended or adjusted under 35 U.S.C. 154(b) by 0 days.

(21) Appl. No.: 10/226,057

(22) Filed: Aug. 22, 2002

(65) Prior Publication Data

US 2003/0112058 A1 Jun. 19, 2003

(30) Foreign Application Priority Data

Dec. 18, 2001 (KR) .................................. 2001-80478

(51) Int. Cl.[7] .................................................. G06G 7/12
(52) U.S. Cl. ...................................................... 327/563
(58) Field of Search .............................. 327/551, 552, 327/553, 560, 561, 562, 563

(56) References Cited

U.S. PATENT DOCUMENTS 6,194,920 B1 * 2/2001 Oguri .......................... 327/65
6,466,085 B2 * 10/2002 Setty ........................... 327/563

* cited by examiner

Primary Examiner—Jeffrey Zweizig
(74) Attorney, Agent, or Firm—Marshall, Gerstein & Borun LLP

(57) ABSTRACT

Disclosed is a squelch circuit capable of detecting whether an absolute value of input voltage is over a specific voltage difference or not. The squelch circuit according to the present invention comprises: a first differential amplifier for receiving first and second input signals, for sensing a first voltage difference between the first and second input signals and for outputting a first sensing signal when the first voltage difference is over a specific positive value; a second differential amplifier for receiving the first and second input signals, for sensing a second voltage difference between the first and second input signals and for outputting a second sensing signal when the second voltage difference is over a specific negative value; an offset current determining unit coupled to the first and second differential amplifiers for respectively controlling first and second offset currents of the first and second differential amplifiers to determine the specific positive and negative values; and an output unit for outputting a squelch signal in response to the first and second sensing signals.

23 Claims, 5 Drawing Sheets

SQUELCH CIRCUIT TO CREATE A SQUELCH WAVEFORM FOR USB 2.0

FIELD OF THE INVENTION

The present invention relates to a squelch circuit to create a squelch waveform prescribed in the universal serial bus 2.0; and, more particularly, to a squelch circuit capable of detecting whether an absolute value of input voltage is over a specific voltage difference or not.

DESCRIPTION OF THE RELATED ART

Generally, a squelch circuit has been used to reduce noises of signals received from telecommunication equipments. For example, when a noise of input signals is over a specific value, the squelch circuit in a receiver stops receiving the signals in order that the input noise from outside is not outputted through an output terminal in the receiver and it automatically blocks the power of the receiver. Further, in other fields, the squelch circuit has been widely used in various circuits, which are required to output a signal when it is over a specific value.

In the universal serial bus (hereinafter, referred to as USB), the squelch circuit detects an input signal that is over a specific voltage difference and then outputs a squelch signal, the USB operates in a high-speed mode.

Referring to FIG. 1, a conventional squelch circuit includes a detector and an output unit 20. The detector 10 determines whether a voltage difference between two input signals (dummy input data) Din and DinB is over a specific value. The detector 10 includes: a buffer U1 receiving the two input signals Din and DinB and then outputting an output signal having a hysteresis characteristic; an AND gate U3 combining the output signal from the buffer U1 and an inverted output signal via a delay inverter U2; and a diode U4 connected in series to the AND gate U3.

The output unit 20 receiving an output signal from the diode U4 includes a resistor R1, a capacitor C1 and an output buffer U5. The resistor R1 and the capacitor C1 are provided to determine whether a voltage difference between the output signals from the output buffer U5 and the input signal from the diode U4 is maintained at a specific value.

Referring to FIG. 2, when the voltage difference between the two input signal Din and DinB is over a specific value (V1), the input buffer U1 outputs an output signal having a hysteresis characteristic. The output signal from the input buffer U1 is inverted via the delay inverter U2 and the output signals from both the input buffer U1 and the delay inverter U2 undergoes a logic multiplication in the AND gate U3, thereby forming one-shot-pulses with a shorten pulse width. These one-shot-pulses are continuously transferred to the output unit 20 via the diode U4. Accordingly, an input voltage of the output buffer U5, which is over a specific value, is made by these transferred pulses. If the input voltage of the output buffer U5 is over a specific value, a squelch signal is created in a high voltage level in the output unit 20, and if not, it is created in a low voltage level in the output unit 20.

As a result, if the voltage difference between two input data is V1, a logic high squelch is issued and if the voltage difference between two input data is −V1, a logic low squelch is issued. FIG. 2 is a waveform of the typical squelch signal.

However, the squelch signal required in USB 2.0, which is issued when an absolute value is over a specific value, cannot be provided by the squelch circuit of FIG. 1.

SUMMARY OF THE INVENTION

It is, therefore, an object of the present invention to provide a squelch circuit in compliance with the specifications of USB 2.0.

It is another object of the present invention to provide, a squelch circuit, which is not dependant on a common mode voltage of input signals and then has a wide operating range for the input signals.

In accordance with an aspect of the present invention, there is provided a squelch circuit comprising: a first differential amplifier for receiving first and second input signals, for sensing a first voltage difference between the first and second input signals and for outputting a first sensing signal when the first voltage difference is over a specific positive value; a second differential amplifier for receiving the first and second input signals, for sensing a second voltage difference between the first and second input signals and for outputting a second sensing signal when the second voltage difference is over a specific negative value; an offset current determining unit coupled to the first and second differential amplifiers for respectively controlling first and second offset currents of the first and second differential amplifiers to determine the specific positive and negative values; and an output unit for outputting a squelch signal in response to the first and second sensing signals.

In accordance with another aspect of the present invention, there is provided a squelch circuit comprising: a first differential amplifier for receiving first and second input signals, for sensing a first voltage difference between the first and second input signals and for outputting a first sensing signal when the first voltage difference is over a specific positive value; a second differential amplifier for receiving the first and second input signals, for sensing a second voltage difference between the first and second input signals and for outputting a second sensing signal when the second voltage difference is over a specific negative value; a first current path coupled to the first differential amplifier for by-passing an offset current of the first differential amplifier to determine the specific positive value in response to the first and second input signals; a second current path coupled to the second differential amplifier for by-passing an offset current of the second differential amplifier to determine the specific negative value in response to the first and second input signals; and an output unit for outputting a squelch signal in response to the first and second sensing signals.

BRIEF DESCRIPTION OF THE DRAWINGS

Other objects and aspects of the present invention will become apparent from the following description of the embodiments with reference to the accompanying drawings, in which.

DETAILED DESCRIPTION OF THE INVENTION

Hereinafter, the present invention will be described in detail referring to the accompanying drawings.

Figure 1:
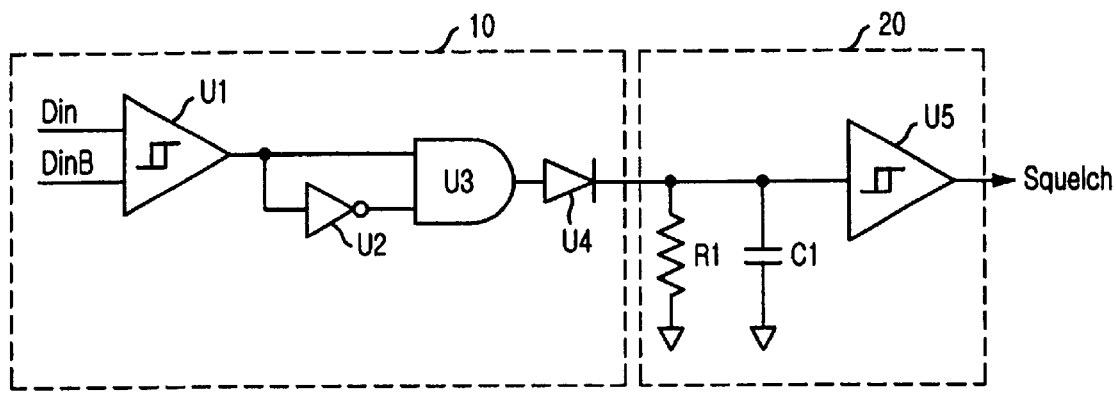
FIG. 1 is a block diagram illustrating a conventional squelch circuit.
Figure 2:
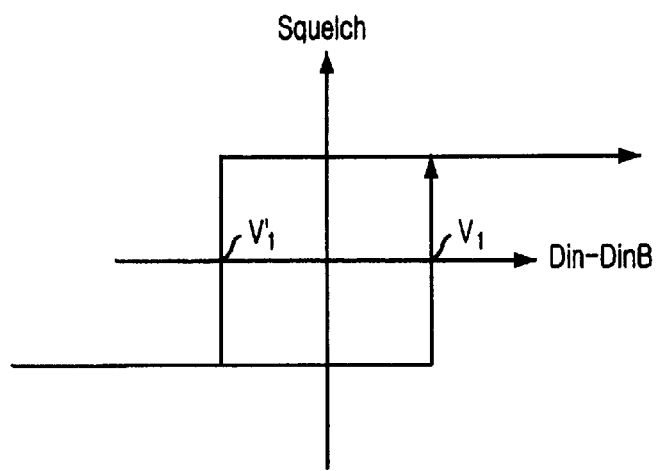
FIG. 2 is a waveform of a squelch signal generated in the squelch circuit of FIG. 1.
Figure 3:
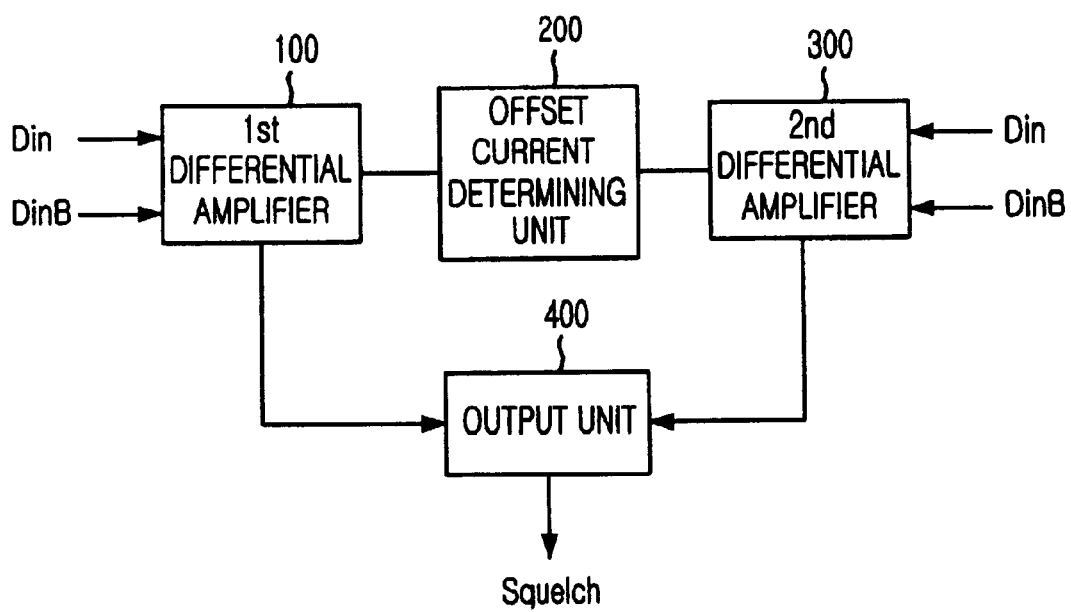
FIG. 3 is a block diagram illustrating a squelch circuit in accordance with an embodiment of the present invention.

Referring to FIG. 3, a squelch circuit according to the present invention includes first and second differential amplifiers 100 and 300, an offset current determining unit 200 and an output unit 400. The first differential amplifier 100 outputs a sensing signal when the voltage difference between input voltages Din and DinB is over a specific positive value and the second differential amplifier 300 outputs a sensing signal when the voltage difference between input voltages Din and DinB is over a specific negative value. The offset current determining unit 200 controls offset currents of the first and second differential amplifiers 100 and 300 and the output unit 400 finally outputs a squelch signal by using the output signals from the first and second differential amplifiers 100 and 300.

A typical differential amplifier has an operation point where a voltage difference between differential input signals is zero (0). In the present invention, the operation point of the differential amplifier is movable by providing a bias voltage, which makes an offset current thereof so that a sensing signal from the differential amplifier is produced only when a voltage difference between the differential input signals is over a specific value.

On the other hand, the Early effect is achieved by changing a bias voltage applied to a gate of a MOS transistor for a current source in the typical differential amplifier; however, in the present invention, such an Early effect is achieved by the offset current determining unit 200 as shown in FIG. 3.

Generally, a current of a current source in typical differential amplifiers is changed according to a common mode voltage of two differential input signals. Accordingly, the present invention determines an operation point of the first and second differential amplifiers 100 and 300, by providing the offset current determining unit 200 with a current source which changes a current according to the common mode voltage of two differential input signals Din and DinB.

Figure 4A:
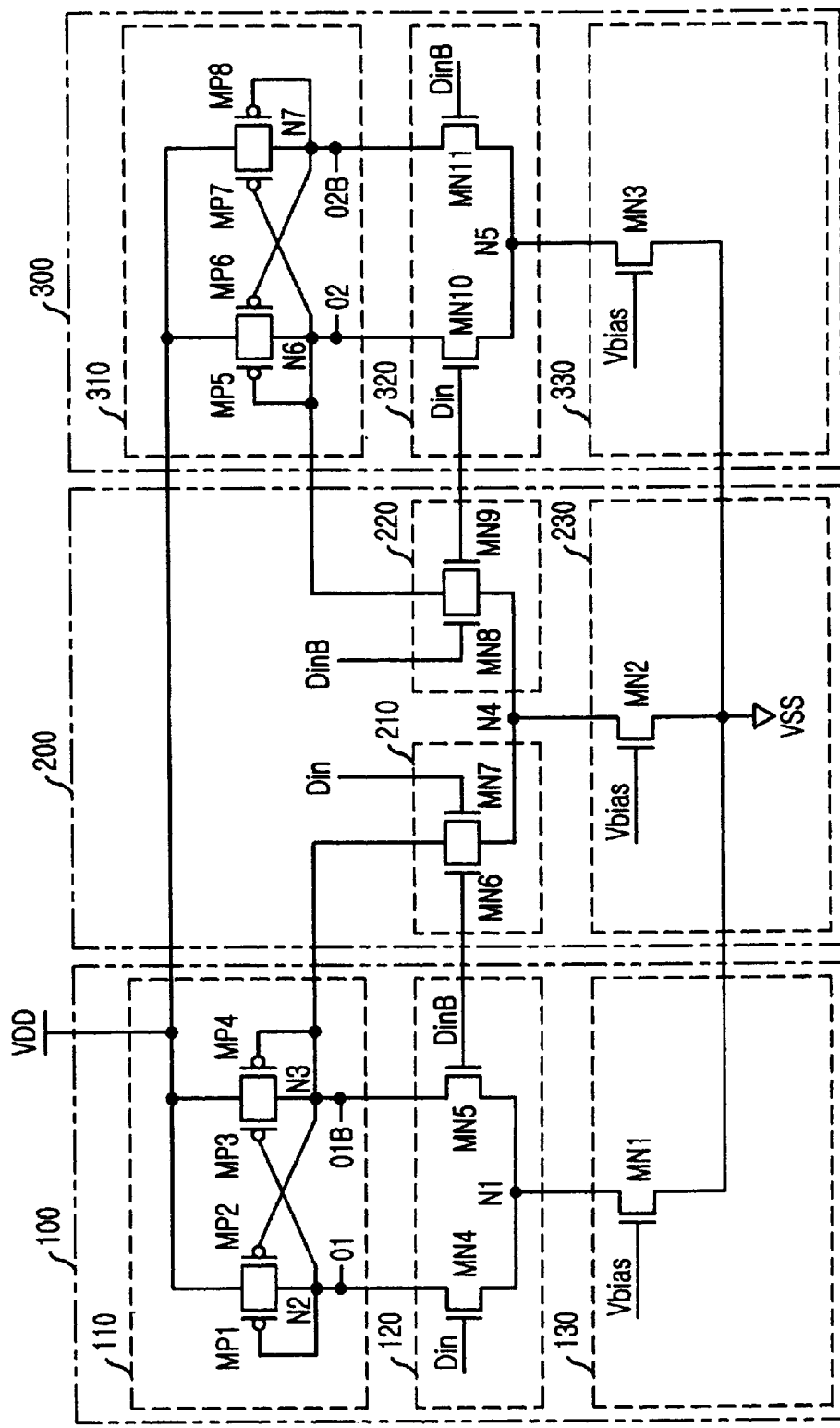
FIG. 4A is a circuit diagram of first and second differential amplifiers and an offset current determining unit of FIG. 3.

Referring to FIG. 4A, the first differential amplifier 100 includes a first input unit 120 receiving differential input signals Din and DinB, a first current source 130 receiving a bias voltage $V_{bias}$ and making a current toward a ground voltage level, and a first load 110 between the first differential amplifier 100 and a power supply to produce a hysteresis characteristic to a squelch signal.

The first input unit 120 includes NMOS transistors MN4 and MN5, which receive input signals Din and DinB through their gates, respectively, and sources of the NMOS transistors MN4 and MN5 are commonly connected to node N1. Drains of NMOS transistors MN4 and MN5 are respectively connected to node N2 and N3.

In such a same manner, the first load 110 includes cross-coupled PMOS transistors MP2 and MP3 between the power supply VDD and nodes N2 and N3. Further, the first load 110 includes a diode-connected PMOS transistor MP1 between the power supply VDD and node N2 and another diode-connected PMOS transistor MP4 between the power supply VDD and node N3.

The first current source 130 is made up of an NMOS transistor MN1 of which gate receive the bias voltage $V_{bias}$.

The first differential amplifier 300 includes a second input unit 320 receiving the differential input signals Din and DinB, a second current source 330 receiving the bias voltage $V_{bias}$ and making a current toward a ground voltage level, and a second load 310 between the second differential amplifier 300 and the power supply to produce a hysteresis characteristic to a squelch signal.

The second input unit 320 includes NMOS transistors MN6 and MN6, which receive input signals Din and DinB through their gates, respectively, and sources of the NMOS transistors MN10 and MN11 are commonly connected to node N5. Drains of NMOS transistors MN10 and MN11 are respectively connected to node N6 and N7.

The second load 310 includes cross-coupled PMOS transistors MP6 and MP7 between the power supply VDD and nodes N6 and N7. Further, the second load 310 includes a diode-connected PMOS transistor MP5 between the power supply VDD and node N6 and another diode-connected PMOS transistor MP8 between the power supply VDD and node N7.

The second current source 330 is also made up of an NMOS transistor MN3 of which gate receive the bias voltage $V_{bias}$.

The offset current determining unit 200 coupled to output terminals (N3 and N6) of the first and second differential amplifiers 100 and 300 forms current paths under the control of the differential input signals Din and DinB, including a third current source 230. The first current path is coupled to an output terminal of the first differential amplifier 100 and the second current path is coupled to an output terminal of the second differential amplifier 300. First and second current paths 210 and 220 are respectively provided on the first and second current paths, being controlled by the differential input signals Din and DinB. Accordingly, the offset current determining unit 200 controls the offset currents of the first and second differential amplifiers 100 and 300.

The first current path 210 includes NMOS transistors MN6 and MN7, which are responsive to the differential input signals DinB and Din, respectively, so that the first current path 210 selectively connects node N3 to node N4 in response to the differential input signals Din and DinB. Likewise, the second current path 220 includes NMOS transistors MN8 and MN9, which are responsive to the differential input signals DinB and Din, respectively, so that the second current path 220 selectively connects node N6 to node N4 in response to the differential input signals Din and DinB.

The third current source 230 includes an NMOS transistor MN2 to electrically connect node N4 to a ground voltage level in response to a bias voltage signal $V_{bias}$. The bias voltage signal $V_{bias}$ is used as an enable signal for the first and second differential amplifiers 100 and 300 and the offset current determining unit 200.

Figure 4B:
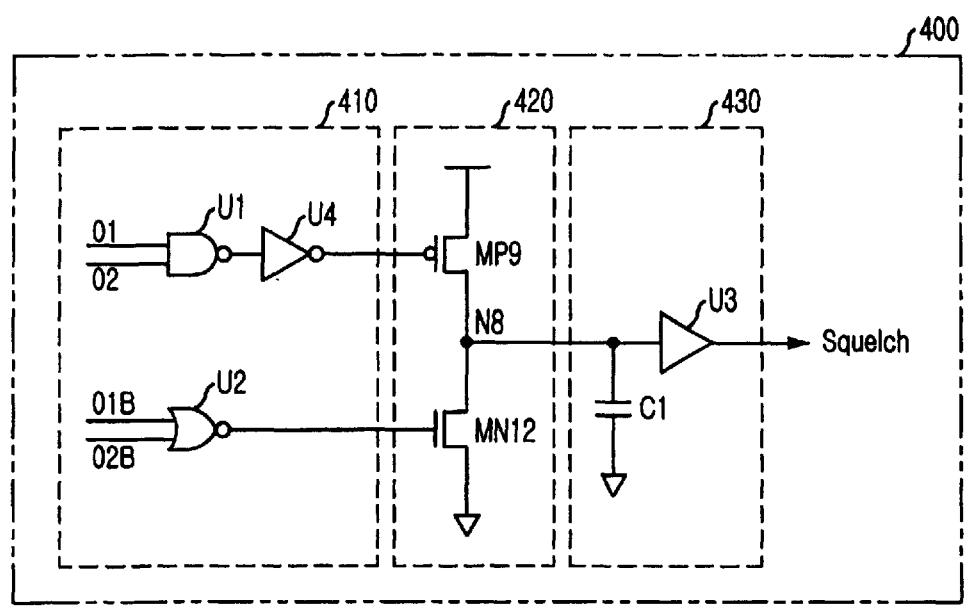
FIG. 4B is a circuit diagram an output unit of FIG. 3.

FIG. 4B is a configuration illustrating the output unit 400 in FIG. 3. As shown in FIG. 4B, the output unit 400 includes an input unit 410, an inverting unit 420 and an output unit 430. The input unit 410 includes a NAND gate U1, an inverter U4 and a NOR gate U2. The NAND gate U1 receives output signals from an output terminal (O1) of the first differential amplifier 100 and an output terminal (O2) of the second differential amplifier 300. The inverter U4 inverts an output signal from the NAND gate U1. It should be noted that the output terminal (O1) of the first differential amplifier 100 is not connected to the offset current determining unit 200 and the output terminal (O2) of the second differential amplifier 300 is connected to the offset current determining unit 200. The NOR gate U2 receives output signals from an output terminal (O1B) of the first differential amplifier 100 and an output terminal (O2B) of the second differential amplifier 300.

The inverting unit 420 is made up of a CMOS inverter having a PMOS transistor MP9 and an NMOS transistor MN12. A gate of the PMOS transistor MP9 is connected to the inverter U4 and a gate of the NMOS transistor MN12 is connected to the NOR gate U2.

The output unit 430 is connected to an output node N8 of the inverting unit 420, including a capacitor C1 to store a specific value of electric charges and a buffer U3 to produce a squelch signal in response to an amount of electric charges in the capacitor C1. Accordingly, when a voltage across the capacitor C1 is over a specific voltage, the buffer U3 issues the squelch signal.

Figure 5:
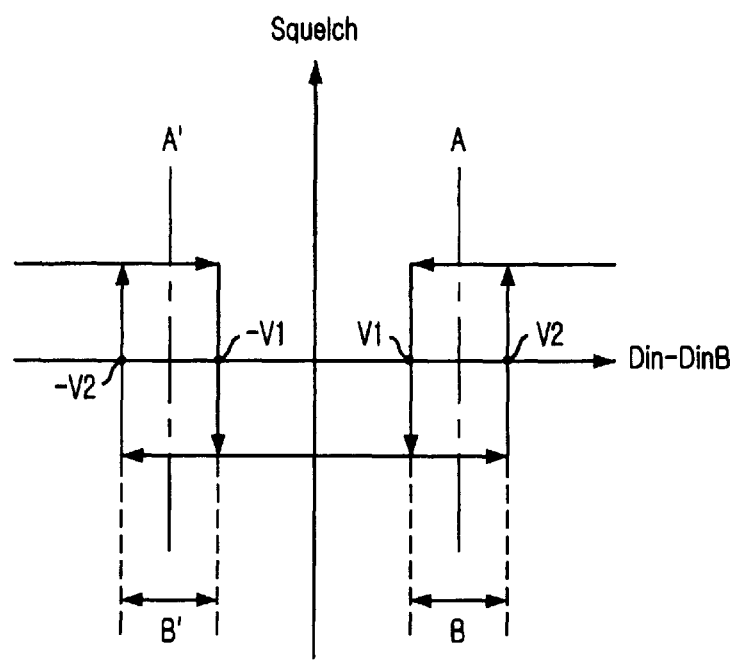
FIG. 5 is a waveform of a squelch signal generated in accordance with the present invention.

FIG. 5 is a plot illustrating characteristics of the squelch signal according to the present invention. In FIG. 5, line A ((V1+V2)/2) denotes an operating point of the first differential amplifier 100 and it is determined by a drivability difference between the first and third current sources 130 and 230. Line A' ((−V1+(−V2))/2) denotes an operation point of the second differential amplifier 300 and line A' is determined by a drivability difference between the second and third current sources 130 and 230. Accordingly, the more the drivability of the third current source increases, the more lines A and A' are moved away from the center (0).

Referring again to FIG. 4A, since the first differential amplifier 100 has the third current source 230 for an offset current, the voltage difference required to amplify a signal is determined by the third current source 230. As a result, the first differential amplifier 100 generates output signals 01 and 01B only when the voltage difference between the differential input signals Din and DinB is over a specific positive value and this specific positive value is also determined by the drivability of the third current source 230. Likewise, in the second differential amplifier 300, output signals 02 and 02B are generated only when the voltage difference between the differential input signals Din and DinB is over a specific negative value and this specific negative value is determined by the drivability of the third current source 230.

Accordingly, it is possible to obtain the squelch signals prescribed in USB 2.0, by symmetrically coupling the first differential amplifier 100 to the second differential amplifier 300 via the third current source 200 and by achieving the same current drivability ratio between the first and second differential amplifiers 100 and 300 via the third current source 200. That is, the squelch signals are obtained according to an absolute value of the difference between the differential input signals Din and DinB.

Further, if the cross-coupled PMOS transistors MP2 and MP3 in the first load 110 are designed to be lager than the diode-connected PMOS transistors MP1 and MP4, the width (B) of the hysteresis becomes wider.

When the differential input signals Din and DinB are gradually rising and falling, the NMOS transistor MN4 is turned on and the current flows from node N2 to node N1. At this time, since the NMOS transistor MN1 is turned on by the bias voltage signal $V_{bias}$, the current flows to the ground voltage level Vss. Accordingly, an amount of current at node N3 is decreased and an amount of current at node N1 is increased so that a hysteresis characteristic does not appear in the first deferential amplifier 100.

On the other hand, the voltage drops at node N2 so that the PMOS transistor MP3 is turned on. However, in the present invention, the diode-connected PMOS transistors MP1 and MP4 in the first load 110 are different from the cross coupled PMOS transistors MP3 and MP2 in their current drivability, that is, the drivability of the PMOS transistors MP2 and MP3 are higher than that of the PMOS transistors MP1 and MP4. Accordingly, the current at node N3 is the same as that at node N2 for a predetermine time and then a sensing voltage does not appear. When the voltage continuously drops at node N2 and the drivability of the PMOS transistor MP3 is higher than that of the PMOS transistor MP1, a sensing voltage (differential voltage) appears.

Likewise, if the differential input signals Din and DinB are gradually falling and rising, the current decreases at node N2 and the current at node N3 is increased. The PMOS transistor MP2 is turned on so that the current is provided to node N2. Accordingly, the current at node N2 is the same as that at node N3 for a predetermine time and then a sensing voltage does not appear (width of "B" in FIG. 5). When the differential input signal DinB is continuously rising, the current at node N3 is more increased than that at node N2 because the voltage drop at node N3 is much more. Accordingly, a sensing voltage (differential voltage) appears.

Being different from conventional differential amplifiers for amplifying a difference between two input signals base on a constant operating current (the first current source), the first deferential amplifier 100 is characterized in that a point causing a current difference at node N2 is different from that at node N3 due to the diode-connected PMOS transistors MP1 and MP4 and the cross-coupled PMOS transistors MP2 and MP3.

Likewise, the second load 310 in the second differential amplifier 300 has a hysteresis characteristic with a width of "B" as shown in FIG. 5.

The third current 230 in the offset current determining unit 200 is coupled to the first and second differential amplifiers 100 and 300 via first and second current paths 210 an 220. The third current 230 flows an offset current in order to control an operation point of the first and second differential amplifiers 100 and 300.

The currents which flow in the current sources 130 and 330 of the first and second differential amplifiers 100 and 300 are varied according to the voltages at nodes N1 and N5 due to the Eearly effect. Gates of the NMOS transistors MN6 and MN7 in the first current path 210 are connected to the differential input signals Din and DinB, respectively. Accordingly, when the differential input signals Din and DinB are at a common mode (namely, when two input voltages are the same), the offset current of the third current source 230 is also varied according to the voltage of the common mode so that the squelch signal is not influenced on the variation of voltage of the common mode. This means that the squelch signal of the present invention is in a wide operation range.

In similar to the first differential amplifiers 100, since the second current path 220 has the same functions as the first current path 210, it is also in a wide operation range.

As a result, the squelch signals, which comply with the specifications of USB 2.0, are obtained by means of the offset current of the third current source 230 and the cross-coupled PMOS transistors MP2, MP3, MP6 and MP7 in the first and second load 110 and 310.

Referring to FIG. 4b, output signals 01 and 02 from the first and second differential amplifiers 100 and 300 are inputted to a NAND gate U1 and the NAND gate U1 outputs a high voltage signal. A PMOS transistor MP9 is turned on by a low voltage signal from an inverter U4. A capacitor C1, which is connected in parallel to an output buffer U3, is provided to output the squelch signal after a voltage difference between the input signals is maintained for a predetermined time.

Figure 6:
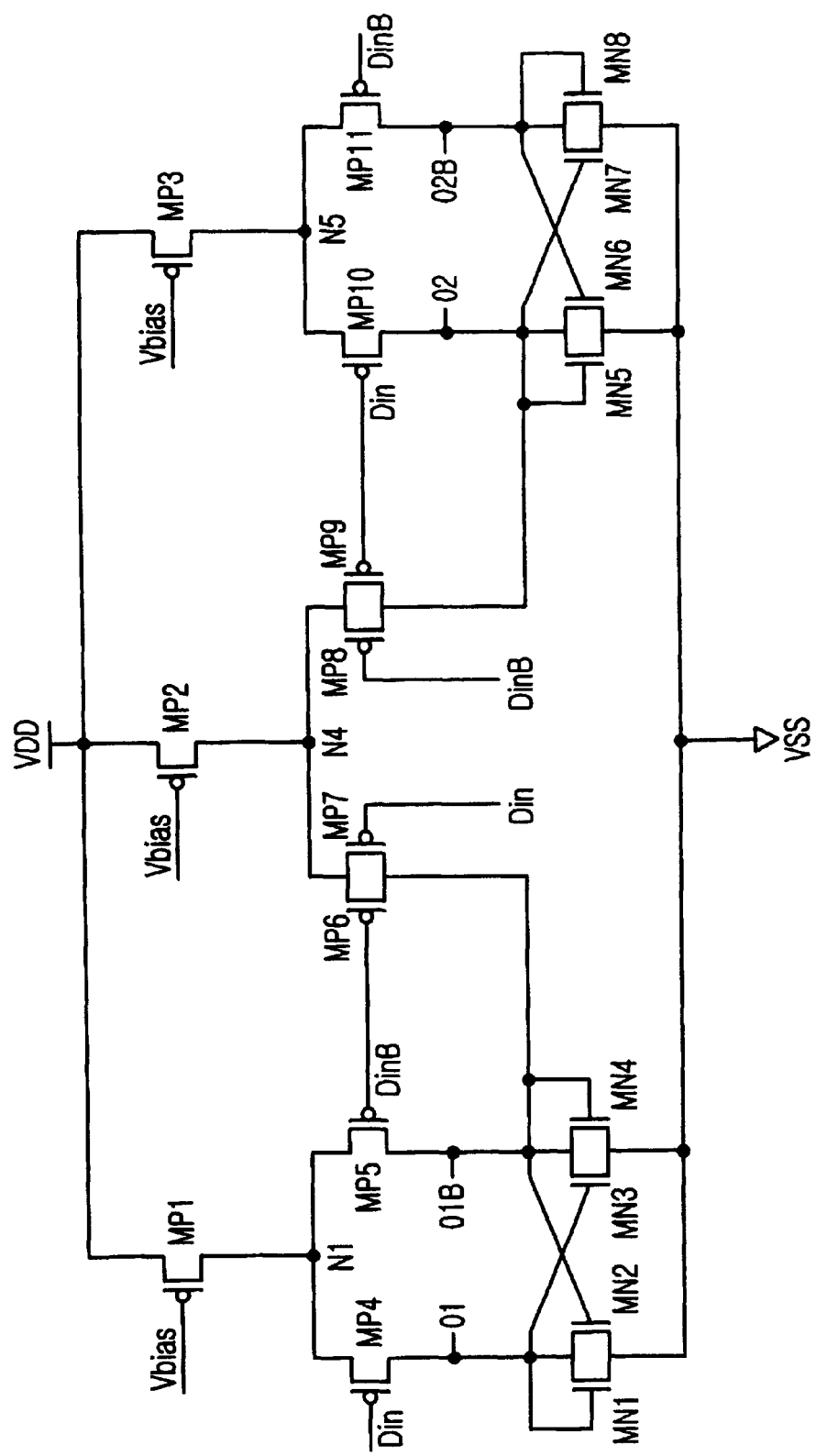
FIG. 6 is a circuit diagram of first and second differential amplifiers and an offset current determining unit of FIG. 3 in accordance with an embodiment of the present invention.

FIG. 6 is a circuit diagram of first and second differential amplifiers 100 and 300 and an offset current determining unit 200 which are implemented by PMOS current source. As shown in FIG. 6, the PMOS and NMOS transistors in FIG. 4A are replaced with NMOS and PMOS transistors, respectively.

As apparent from the above, the squelch circuit according to the present invention is in compliance with the specifications of USB 2.0 and has a wide operating range for the input signals because it is not dependant on a common mode voltage of input signals.

While the present invention has been described with respect to certain preferred embodiments, it will be apparent to those skilled in the art that various changes and modifications may be made without departing from the scope of the invention as defined in the following claims.

What is claimed is:

1. A squelch circuit comprising:
    a first differential amplifier for receiving first and second input signals, for sensing a first voltage difference between the first and second input signals and for outputting a first sensing signal when the first voltage difference is over a specific positive value;
    a second differential amplifier for receiving the first and second input signals, for sensing a second voltage difference between the first and second input signals and for outputting a second sensing signal when the second voltage difference is over a specific negative value;
    an offset current determining unit coupled to the first and second differential amplifiers for respectively controlling first and second offset currents of the first and second differential amplifiers to determine the specific positive and negative values; and
    an output unit for outputting a squelch signal in response to the first and second sensing signals.

2. The squelch circuit as recited in claim 1, wherein the offset current determining unit controls the first and second offset currents in response to the first and second input signals.

3. The squelch circuit as recited in claim 1, wherein the first differential amplifier includes:
    a differential input unit for controlling the first offset current in response to the first and second input signals;
    a load providing means connecting a power supply to the input unit, wherein the load providing means has a hysteresis characteristic; and
    a current source flowing the first offset current.

4. The squelch circuit as recited in claim 3, wherein the differential input unit includes:
    a first input unit controlling the first offset current in response to the first input signal; and
    a second input unit controlling the first offset current in response to the second input signal.

5. The squelch circuit as recited in claim 4, wherein the load providing means includes:
    a first load connected between the power supply and the first input unit;
    a second load connected between the power supply and the second input unit;
    a third load connected between the power supply and the first input unit; and
    a fourth load connected between the power supply and the second input unit, wherein the fourth load is cross-coupled to the third load.

6. The squelch circuit as recited in claim 5, wherein the third and fourth loads are respectively connected to output terminals of the first differential amplifier.

7. The squelch circuit as recited in claim 5, wherein the first and second loads are diode-connected MOS transistors, respectively.

8. The squelch circuit as recited in claim 5, wherein the third and fourth loads are cross-coupled MOS transistors, respectively.

9. The squelch circuit as recited in claim 3, wherein the current source is a MOS transistor of which gate receives a bias voltage.

10. The squelch circuit as recited in claim 3, wherein the first and second input units are MOS transistors, respectively, and wherein gates of the MOS transistors receive the first and second input signals, respectively.

11. The squelch circuit as recited in claim 1, wherein the second differential amplifier includes:
    a differential input unit for controlling the first offset current in response to the first and second input signals;
    a load providing means connecting a power supply to the input unit, wherein the load providing means has a hysteresis characteristic; and
    a current source flowing the first offset current.

12. The squelch circuit as recited in claim 11, wherein the differential input unit includes:
    a first input unit controlling the first offset current in response to the first input signal; and
    a second input unit controlling the first offset current in response to the second input signal.

13. The squelch circuit as recited in claim 12, wherein the load providing means includes:
    a first load connected between the power supply and the first input unit;
    a second load connected between the power supply and the second input unit;
    a third load connected between the power supply and the first input unit; and
    a fourth load connected between the power supply and the second input unit, wherein the fourth load is cross-coupled to the third load.

14. The squelch circuit as recited in claim 13, wherein the third and fourth loads are respectively connected to output terminals of the first differential amplifier.

15. The squelch circuit as recited in claim 13, wherein the first and second loads are diode-connected MOS transistors, respectively.

16. The squelch circuit as recited in claim 13, wherein the third and fourth loads are cross-coupled MOS transistors, respectively.

17. The squelch circuit as recited in claim 11, wherein the current source is a MOS transistor of which gate receives a bias voltage.

18. The squelch circuit as recited in claim 12, wherein the first and second input units are MOS transistors, respectively, and wherein gates of the MOS transistors receive the first and second input signals, respectively.

19. The squelch circuit as recited in claim 1, wherein the offset current determining unit includes:
    a current source;
    a first current path coupled between the current source and the first differential amplifier for by-passing an offset current of the first differential amplifier in response to the first and second input signals; and a first current path coupled between the current source and the second differential amplifier for by-passing an offset current of the second differential amplifier in response to the first and second input signals.

20. The squelch circuit as recited in claim 19, wherein the current source is a MOS transistor of which gate receives a bias voltage.

21. The squelch circuit as recited in claim 20, wherein the first and second current path are MOS transistors of which gates receive the first and second input signals, respectively.

22. A squelch circuit comprising:
a first differential amplifier for receiving first and second input signals, for sensing a first voltage difference between the first and second input signals and for outputting a first sensing signal when the first voltage difference is over a specific positive value;
a second differential amplifier for receiving the first and second input signals, for sensing a second voltage difference between the first and second input signals and for outputting a second sensing signal when the second voltage difference is over a specific negative value;
a first current path coupled to the first differential amplifier for by-passing an offset current of the first differential amplifier to determine the specific positive value in response to the first and second input signals;
a second current path coupled to the second differential amplifier for by-passing an offset current of the second differential amplifier to determine the specific negative value in response to the first and second input signals; and
an output unit for outputting a squelch signal in response to the first and second sensing signals.

23. The squelch circuit as recited in claim 22, wherein the first current path is controlled in response to the first and second input signals and wherein the second current path is controlled in response to the first and second input signal.

\* \* \* \* \*